(12) United States Patent
Baldwin et al.

(10) Patent No.: US 8,907,214 B1
(45) Date of Patent: Dec. 9, 2014

(54) STACKABLE ELECTRICAL BOX

(75) Inventors: Jeffrey P. Baldwin, Phoenix, AZ (US); Richard L. Cleghorn, Tempe, AZ (US)

(73) Assignee: Hubbell Incorporated, Shelton, CT (US)

( * ) Notice: Subject to any disclaimer, the term of this patent is extended or adjusted under 35 U.S.C. 154(b) by 162 days.

(21) Appl. No.: 13/596,902

(22) Filed: Aug. 28, 2012

Related U.S. Application Data

(63) Continuation of application No. 12/789,328, filed on May 27, 2010, now Pat. No. 8,253,016.

(60) Provisional application No. 61/181,909, filed on May 28, 2009, provisional application No. 61/181,469, filed on May 27, 2009.

(51) Int. Cl.
*H02G 3/08* (2006.01)

(52) U.S. Cl.
USPC ............... 174/50; 174/53; 174/57; 174/58; 220/3.2; 220/3.3; 206/503

(58) Field of Classification Search
USPC ....... 174/50, 53, 57, 58, 17 R, 480, 481, 482, 174/135, 559, 560, 561; 220/3.2–3.9, 4.02, 220/3.94; 361/600, 601, 728, 729, 730, 361/731; 312/223.1, 223.2; 206/507, 503, 206/505, 508
See application file for complete search history.

(56) References Cited

U.S. PATENT DOCUMENTS

| | | | |
|---|---|---|---|
| 2,425,545 A | 8/1947 | Lefebre | |
| 2,606,586 A | 8/1952 | Hill | |
| 2,742,181 A * | 4/1956 | Jarund | 206/507 |
| 3,952,908 A | 4/1976 | Carson | |
| 4,307,264 A | 12/1981 | Hess | |
| 4,316,540 A * | 2/1982 | Lapham | 206/507 |
| 4,365,108 A | 12/1982 | Bright | |
| 4,759,451 A * | 7/1988 | Apps | 206/507 |
| 4,919,267 A * | 4/1990 | Stoll | 206/507 |
| 4,925,045 A | 5/1990 | Logsdon | |
| 5,072,911 A | 12/1991 | Logsdon | |
| 5,142,102 A | 8/1992 | Michie | |
| 5,668,350 A | 9/1997 | Yanase | |
| 6,084,395 A | 7/2000 | Thiel | |
| 6,198,045 B1 | 3/2001 | Roesch | |
| 6,953,894 B2 * | 10/2005 | Ungerman et al. | 174/58 |
| 7,165,366 B2 * | 1/2007 | Anliker | 174/64 |

* cited by examiner

*Primary Examiner* — Angel R Estrada
(74) *Attorney, Agent, or Firm* — Garrett V. Davis; Mark S. Bicks; Alfred N. Goodman

(57) ABSTRACT

A method and structure of a system of electrical boxes including differing patterns of interference structures, such as ribs and/or grooves, to prevent identical boxes from being nested but permit non-identical boxes from being nested for more space-efficient storage of electrical boxes.

23 Claims, 4 Drawing Sheets

STACKABLE ELECTRICAL BOX

CROSS REFERENCE TO RELATED APPLICATIONS

This is a continuation of U.S. application Ser. No. 12/789,328 entitled "Stackable Electrical Box" to Jeffrey P. Baldwin et al. which was filed on May 27, 2010, which claims the benefit of the filing date of U.S. Provisional Patent Application 61/181,909 to Cleghorn entitled "Electrical Box," which was filed on May 28, 2009, the disclosure of which is hereby incorporated herein by reference.

BACKGROUND OF THE INVENTION

1. Technical Field

Aspects and implementations of this document relate generally to electrical boxes. Particular implementations include electrical boxes designed to be nested with each other in a variety of ways (e.g., vertically stacked in a nested configuration) for storage, shipment, and the like.

2. Background Art

Electrical boxes are well known in the art of the electrical installation aspects of construction to house electrical components of such things as switches and receptacles. Conventional electrical boxes are typically one-piece structures with external features that make them somewhat voluminous. Therefore, it is desirable to improve the storability, portability and shipability of electrical boxes by providing electrical boxes designed to be nested and stacked allowing the boxes to be maintained in as minimal a space as possible.

There are multiple variations of electrical box designs known in the art including designs that accommodate any number of wires and wiring gauges, include external features to facilitate mounting or securing to external construction or other characteristics. Features of electrical boxes typically facilitate installation and improve functionality of the electrical box but these features may also make compact storage of groups of electrical boxes difficult.

SUMMARY

This disclosure includes one or more electrical box designs that do not impact the installation capabilities or features of an electrical box but allow nesting to reduce the amount of space required to store, carry or ship multiple boxes. A particular implementation employs nesting features that are reversed from left to right or front to back for at least two variations within a family of products. These features may include, for example, ribs, grooves, notches, chamfers, tapers, key ways, protrusions, bosses, or other features that allow the stacking of electrical boxes in a specific orientation while prohibiting the stacking of electrical boxes in a different orientation.

When nesting features of electrical boxes of a single model within a product family include two variations, the product may be shipped or stored in an X-Y-X-Y pattern where X and Y represent the two patterns of a single electrical box model with reversed stacking features of one another. Other features of the electrical boxes may not be reversed for the X-Y pattern in order to maintain standard installation, such as the angle of the mounting brackets or the position of fastener guides.

However, the nesting features do not necessarily need to be reversed of one another. Features may be added that allow for nesting of patterns that may include more than two patterns such that a model with three pattern variations, X, Y and Z allow for nesting in an X-Y-Z-X-Y-Z pattern. The nesting features are not limited to two or three patterns within a specific model and features but may include any number of patterns necessary to allow stacking based on a desired pattern. Clearly, the added features can be employed in other manners to achieve similar results as well. Any number of features may be employed in any manner to create different versions of electrical boxes and accomplish the various stacking patterns envisioned in this document. This document is not limited to the stated examples and other configurations are possible and within the teachings of the present disclosure.

In a first aspect, a system of electrical boxes may comprise first and second similarly sized electrical boxes each comprising at least four sides extending from a bottom to an open top and at least two box mounting screw apertures adjacent to each of at least two sides, each box mounting screw aperture comprising an opening extending toward the open top of the first electrical box, a first pattern of at least one interfering structure on an external surface of at least one of the at least four sides of the electrical box adjacent to the bottom of the first electrical box, and a second pattern of at least one interfering structure on an internal surface of at least one of the at least four sides of the electrical box adjacent to the open top of the first electrical box, wherein the first and second patterns of interfering structures of the first electrical boxes interfere with corresponding second and first patterns of interfering structures of other first electrical boxes to prevent nesting of two first electrical boxes, but do not interfere with second and first patterns of interfering structures of the second electrical boxes to permit nesting of first electrical boxes within second electrical boxes and second electrical boxes within first electrical boxes.

Particular implementations of a system of electrical boxes may comprise one or more of the following features. In a system of electrical boxes, the first pattern of interfering structures of each of the electrical boxes may comprise at least one rib extending toward the bottoms of the respective electrical boxes from adjacent the open tops. In a system of electrical boxes, each of the first and second electrical boxes may further comprise a shoulder formed between the open top and the bottom of the respective electrical boxes such that the bottom of the first electrical box is smaller than the open top of the second electrical box and the bottom of the second electrical box is smaller than the open top of the first electrical box and the respective shoulders establish a nesting limit to stop nesting movement of the respective electrical boxes within each other. Shoulders may be included only on one side and up to and including any number of sides of an electrical box. Additionally, shoulders on any side may be combined with sides that are angled at the bottom of the box. Such implementations would facilitate the nesting of one electrical box into another electrical box while limiting the nesting movement with a shoulder on the nested electrical boxes. In a system of electrical boxes, the first pattern of interfering structures of the respective electrical boxes may each comprise at least one rib extending toward the bottoms of the respective electrical boxes from adjacent the open top. In a system of electrical boxes, the shoulders of the respective electrical boxes may be approximately midway between the respective open tops and the bottoms. In a system of electrical boxes, the shoulders of the respective electrical boxes may be formed on at least two sides of the respective electrical boxes. In a system of electrical boxes, at least two opposing sides of each of the first and second electrical boxes may be sloped inward along any distance from the open tops of the respective electrical boxes to the bottoms of the respective electrical boxes to accommodate nesting of the first electrical box into the second electrical box and nesting of the second electrical box into the first electrical box.

In a second aspect, a system of electrical boxes may comprise a first electrical box comprising at least four sides extending from a bottom to an open top and at least two box mounting screw apertures adjacent to each of at least two sides, each box mounting screw aperture comprising an opening extending toward the open top of the first electrical box, a first pattern of at least one interfering structure on an external surface of at least one of the at least four sides of the first electrical box adjacent to the bottom of the first electrical box, and a second pattern of at least one interfering structure on an internal surface of at least one of the at least four sides of the first electrical box adjacent to the open top of the first electrical box; a second electrical box comprising at least four sides extending from a bottom to an open top and at least two box mounting screw apertures adjacent to each of at least two sides, each box mounting screw aperture comprising an opening extending toward the open top of the second electrical box, a third pattern of at least one interfering structure, different from the first pattern, on an external surface of at least one of the at least four sides of the second electrical box adjacent to the bottom of the second electrical box, and a fourth pattern of at least one interfering structure, different from the second pattern, on an internal surface of at least one of the at least four sides of the second electrical box adjacent to the open top of the second electrical box; wherein the first and second patterns of interfering structures interfere with corresponding second and first patterns of interfering structures to prevent nesting of two first electrical boxes but do not interfere with fourth and third patterns of interfering structures to permit nesting of the first electrical box with the second electrical box.

Particular implementations of a system of electrical boxes may comprise one or more of the following features. In a system of electrical boxes, the first pattern of interfering structures of the first electrical box may comprise at least one rib extending toward the bottom of the first electrical box from adjacent the open top. A system of electrical boxes may further comprise a shoulder formed between the open top and the bottom of the first electrical box such that the bottom of the first electrical box is smaller than the open top of the second electrical box and the shoulder establishes a nesting limit to stop nesting movement of the first electrical box into the second electrical box beyond the shoulder. In a system of electrical boxes, the first pattern of interfering structures of the first electrical box may comprise at least one rib extending toward the bottom of the first electrical box from adjacent the open top. In a system of electrical boxes, the shoulder may be approximately midway between the open top and the bottom of the first electrical box such that nesting of the first electrical box into the second electrical box allows the bottom of the first electrical box to be slid approximately halfway to the bottom of the second electrical box. In a system of electrical boxes, the shoulder may be formed on at least two sides of the first electrical box. In a system of electrical boxes, at least two opposing sides of each of the first electrical box and the second electrical box may be sloped inward along any distance from the open tops of the respective electrical boxes to the bottoms of the respective electrical boxes to accommodate nesting of the first electrical box into the second electrical box and nesting of the second electrical box into the first electrical box.

In a system of electrical boxes, the third and fourth patterns of interfering structures interfere with corresponding fourth and third patterns of interfering structures to prevent nesting of two second electrical boxes but do not interfere with second and first patterns of interfering structures to permit nesting of the second electrical box with the first electrical box. A system of electrical boxes may comprise a third electrical box comprising at least four sides extending from a bottom to an open top and at least two box mounting screw apertures adjacent to each of at least two sides, each box mounting screw aperture comprising an opening extending toward the open top of the third electrical box, a fifth pattern of at least one interfering structure, different from the first pattern, on an external surface of at least one of the at least four sides of the third electrical box adjacent to the bottom of the third electrical box, and a sixth pattern of at least one interfering structure, different from the second pattern, on an internal surface of at least one of the at least four sides of the third electrical box adjacent to the open top of the third electrical box, wherein the third and fourth patterns of interfering structures interfere with corresponding third and fourth patterns of interfering structures to prevent nesting of two second electrical boxes but do not interfere with fifth and sixth patterns of interfering structures to permit nesting of the second electrical box with the third electrical box and the first and second patterns of interfering structures do not interfere with the fifth and sixth patterns of interfering structures to permit nesting of the first electrical box with the third electrical box.

In a third aspect, a method of stacking electrical boxes may comprise providing a first plurality of first electrical boxes each comprising a first pattern of interfering structures and a second plurality of second electrical boxes each comprising a second pattern of interfering structures different from the first pattern, and stacking the first and second pluralities of first and second electrical boxes in an alternating first-second pattern by nesting first electrical boxes into second electrical boxes and second electrical boxes into first electrical boxes.

Particular implementations of a method of stacking electrical boxes may comprise one or more of the following. A method of stacking electrical boxes may further comprise preventing nesting of first electrical boxes within first electrical boxes by interference between interfering structures of the first pattern on one first electrical box with interfering structures of the first pattern on another first electrical box, and preventing nesting of second electrical boxes within second electrical boxes by interference between interfering structures of the second pattern on one second electrical box with interfering structures of the second pattern on another second electrical box. A method of stacking electrical boxes may further comprise aligning ribs on respective internal surfaces of the first electrical boxes with grooves on external surfaces of the second electrical boxes to permit nesting, and aligning ribs on respective internal surfaces of the second electrical boxes with grooves on external surfaces of the first electrical boxes to permit nesting. A method of stacking electrical boxes may further comprise limiting how far one of the plurality of first electrical boxes nests into one of the plurality of second electrical boxes with a shoulder of the first electrical box contacting the open top of the second electrical box and limiting how far one of the plurality of second electrical boxes nests into one of the plurality of first electrical boxes with a shoulder of the second electrical box contacting the open top of the first electrical box.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

Features of particular embodiments and implementations of electrical boxes will hereinafter be described in conjunction with the appended drawings, where like designations denote like elements, and.

DETAILED DESCRIPTION OF THE INVENTION

This disclosure, its aspects and implementations, are not limited to the specific components or assembly procedures disclosed herein. Many additional components and assembly procedures known in the art consistent with the intended electrical boxes and/or assembly procedures for electrical boxes may be used and will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical boxes and implementing components, consistent with the intended operation and purpose of electrical boxes. As used herein, "electrical boxes" is intended to specifically refer to the types of electrical boxes that are mounted within a wall structure and to which small electrical devices such as electrical switches and electrical receptacles are mounted using box mounting device screws.

Figure 1:
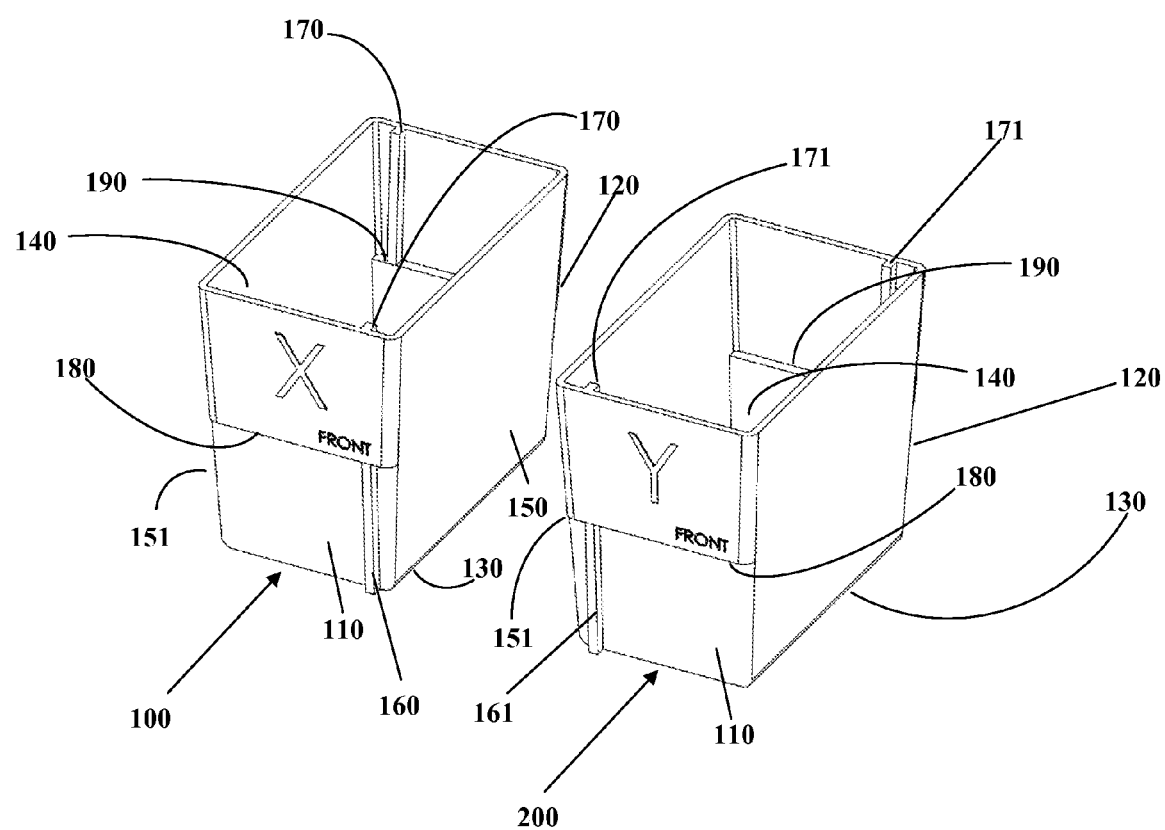
FIG. 1 is an oblique view of sample electrical boxes illustrative of box features.

Accordingly, there are a variety of electrical box implementations. With reference to FIG. 1, an implementation of electrical boxes with reversed or opposite stacking features is represented. This illustrative implementation comprises a simplified electrical box comprising only the box parts itself but without box mounting screw apertures, openings to the box or box mounting bosses or features. The illustrative implementation is intended to illustrate the general features that may be added to any implementation of an electrical box and should be considered to include the elements common to a conventional electrical box in addition to the features described with reference to FIGS. 1 and 2. Specifically, the particular electrical box of FIG. 1 includes a first electrical box 100 with a first pattern of stacking features and a second electrical box 200 with a second pattern of stacking features that are reversed or opposite from those of the first electrical box. It should be noted that the non-identical versions of the illustrative electrical box implementation of FIGS. 1 and 2 are marked X and Y so the stacking pattern would be an X-Y-X-Y pattern.

Each box X and Y has an open top 140, a bottom 130, and 4 sides 110, 120, 150 and 151. The top 140 is open to allow access to the interior of the boxes. Electrical boxes X 100 and Y 200 are not identical because certain features or patterns of features in the boxes are reversed or opposite from each other that cannot be superimposed onto one another. In particular, boxes X 100 and Y 200 each include, among other depicted features, interfering structures, such as, by non-limiting example, opposing internal ribs 170, 171 extending upwards from opposing internal shoulders 190 and opposing external ribs 160, 161 extending downwards from opposing external shoulders 180. The internal ribs 170, 171 and external ribs 160, 161 extend all the way flush with the top and bottom surfaces, respectively, of the electrical boxes. It should be noted, however, that it is not required that the ribs or other features extend all the way flush with the top and bottom surfaces and that in particular contemplated implementations the ribs may extend to within a half inch of the top and bottom surfaces of the electrical boxes. Although the particular implementation shown in FIGS. 1 and 2 includes ribs, other particular implementations may include interfering structures other than ribs such as tabs, indentations, protrusions, shoulders, blocks, grooves, recesses and any other structure which allows or prohibits the nesting of two electrical boxes. Those of ordinary skill in the art will readily identify from this disclosure other structures which can interfere to prevent nesting of the electrical boxes with another identical electrical box but permit nesting with another non-identical box.

Figure 2:
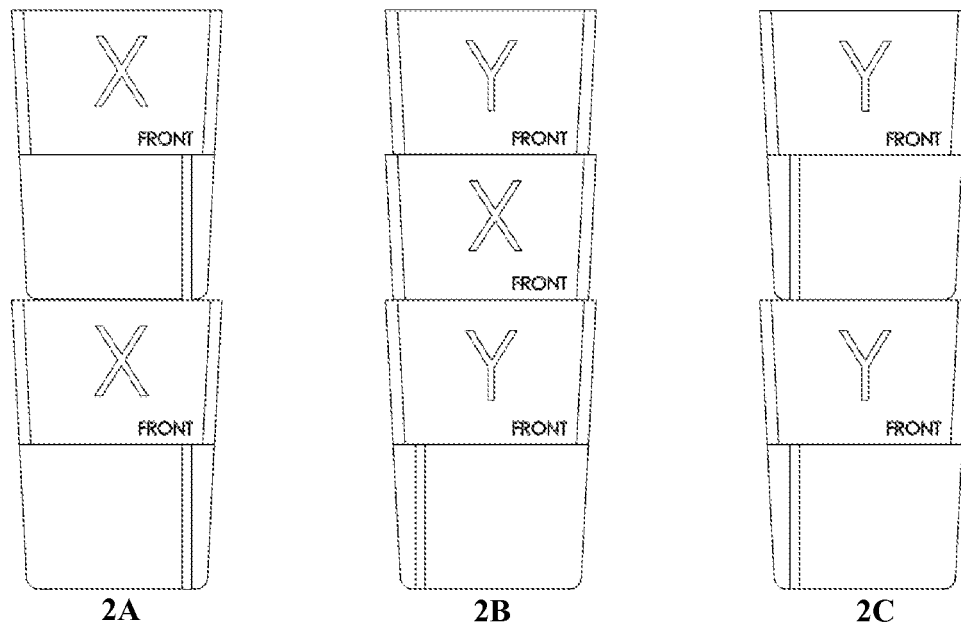
FIG. 2 is a front view of the electrical boxes of FIG. 1 in a stacked position.

As can be seen in FIGS. 1 and 2, each of the two sides 110 120 step towards the interior of the box forming an internal shoulder 190 and an external shoulder 180 that is approximately midway between the top and bottom of the box. These shoulders allow non-identical versions (e.g., X and Y) of the box to be stacked in a vertically nested fashion. That is, the bottom 130 of one box (version X 100) can be slid through the open top 140 of a different box (version Y 200) to a distance that is approximately half way to the bottom. Having shoulders approximately midway between the top and bottom of the box provides the greatest benefit, although a significant benefit would still be achieved if the offsets occurred at any other locations on the interior of the box.

The sides 150, 151 of the box may be otherwise shaped to accommodate nesting. For example, the sides 150, 151 of the box may angle steadily inward along any distance from the top of the box to the bottom of the box or may simply be stepped. As another example, the lower portions of the box may be provided with indentations to accommodate corresponding inward bulges in the upper portions of the box (see, e.g., FIGS. 3-4 below).

Referring now to FIG. 2B, the Y-X-Y stack in the middle is nested. This is because the ribs employed in the electrical box with pattern X 100 and the electrical box with pattern Y 200 are reversed and opposite each other allowing the bottom 130 of the electrical box Y 200 to slide into the open top of electrical box X 100. However, the X-X 100 electrical box stacks of FIG. 2A and the Y-Y 200 electrical box stacks of FIG. 2C cannot nest because the ribs 160 & 170 are exactly aligned with each other when electrical boxes with the same pattern of stacking features are used. As FIG. 2 clearly illustrates, the bottom 130 of one box (version X 100) cannot be slid through the open top 140 of another same box (version X 110). The back 120 of the first box (version X 110) cannot be placed at any depth into the inside of the second identical box (version X 110). As shown in FIG. 2, the internal ribs of the same versions of the box abut one another and physically prevent the same versions of the box from nesting with each other to any depth. There is no orientation that defeats the concept.

Figure 3:
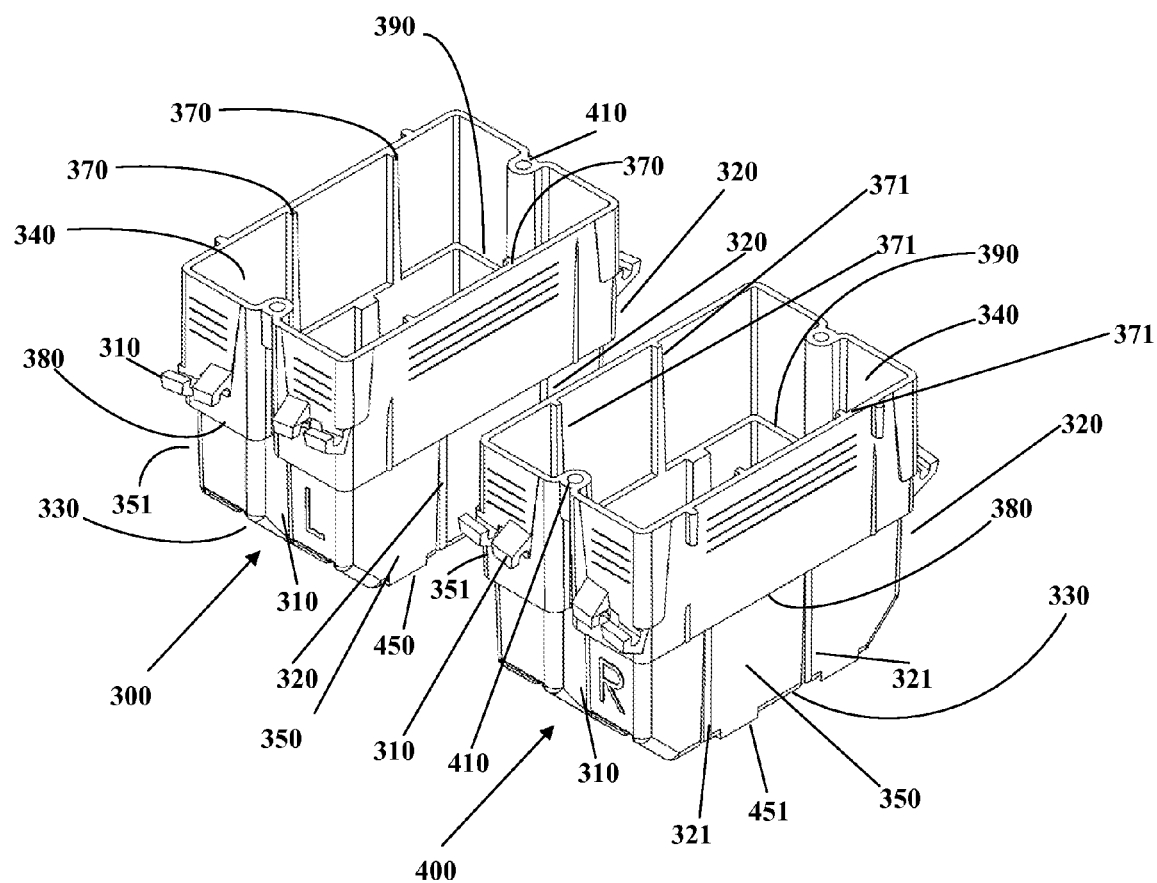
FIG. 3 is an oblique view of representative electrical boxes comprising nail bosses and mounting screw apertures.
Figure 4:
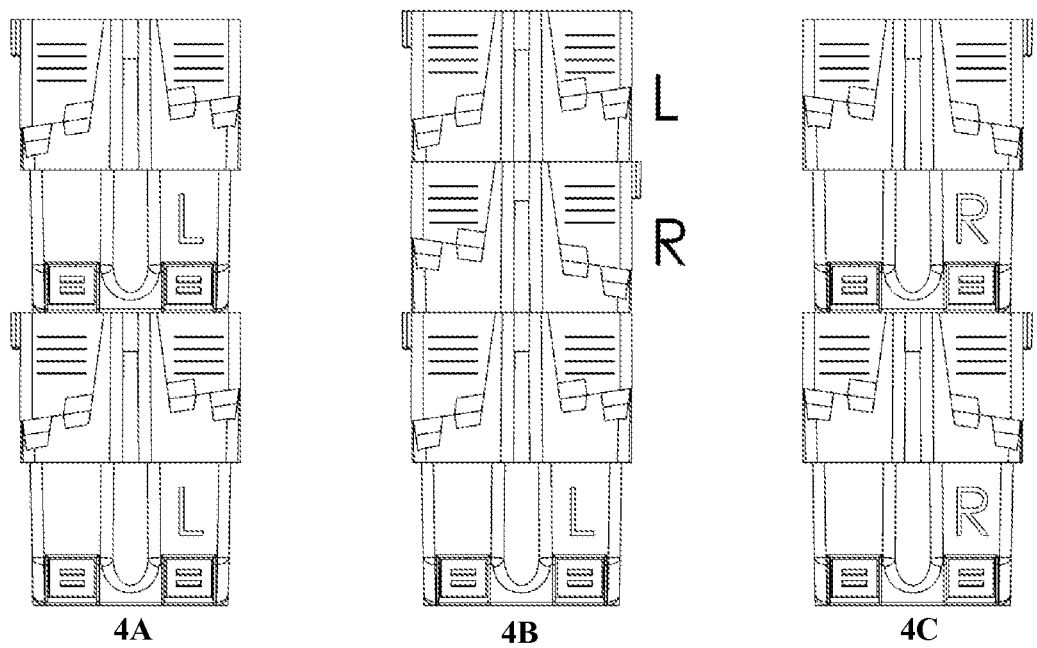
FIG. 4 is a front view of the electrical boxes of FIG. 3 in a stacked position.

Turning to FIGS. 3 and 4, and for the exemplary purposes of this disclosure, another electrical box implementation is shown. It should be noted that the non-identical versions of the electrical box implementation of FIGS. 3 and 4 are marked L and R so the stacking pattern would be L-R-L-R which is the same pattern as the X-Y-X-Y patterns described earlier. The representative examples of FIGS. 3 and 4 differ from the illustrative examples of FIGS. 1 and 2 in that FIGS. 3 and 4 include some of the conventional features such as nail bosses 310 and mounting screw apertures 410 found on an electrical box in addition to the features added through this disclosure. From this disclosure, it is made clear that additional other conventional electrical box features may also be included in other implementations and such conventional features are specifically contemplated through this reference.

Referring specifically to FIG. 3, non-identical electrical box versions L 300 and R 400 are depicted. Each box L and R includes an open top 340, a bottom 330 and at least four sides 310, 320, 350 and 351. The top 340 is open to allow access to the interior of the box. Electrical boxes L 300 and R 400 are not identical because certain features in the boxes are reversed and are mirror images of each other that cannot be superimposed onto one another. In particular, boxes L 300 and R 400 (which in this particular implementation are mirror images of each other though this is not required) include, among other depicted features, interfering structures such as, by non-limiting example, opposing internal offset ribs 370, 371 extending upwards from opposing internal shoulders 390 and corresponding opposing external grooves 320, 321 extending downwards from opposing external shoulders 380. The internal ribs 370, 371 and external grooves 320 extend all the way flush with the top 340 and bottom 330 surfaces, respectively, of the electrical boxes. Although the particular implementation shown in FIGS. 3 and 4 includes ribs and grooves, other particular implementations may include structures other than the ribs and grooves, or the ribs and grooves may be reversed, or both may include ribs as in the illustrative FIGS. 1 and 2.

As can be seen in FIGS. 3 and 4, the sides 350 and 351 of each electrical box steps towards the interior of the box forming a shoulder 380 that is approximately midway between the top 340 and bottom 330 of the box. These shoulders 380 allow non-identical versions (e.g., L 300 and R 400) of the box to be stacked in a vertically nested fashion. That is, the bottom 330 of one box (version L 300) can be slid through the open top 340 of a different box (version R 400) to a distance that is approximately half way to the bottom. Having shoulders 380 approximately midway between the top 340 and bottom 330 of the box provides the greatest benefit, although a significant benefit would still be achieved if the offsets occurred at any other locations on the interior of the box.

Referring to FIG. 4, the L-R-L stack in FIG. 4B is nested. This is because the internal ribs 370, 371 and grooves 320, 321 employed in versions L 300 and R 400 are reversed and are opposite of each other. FIG. 4B is also illustrative of the limited nesting the shoulder 380 allow to electrical box implementations that include this feature. The shoulder of a first electrical box being nested within a second electrical box contacts the open top of the second electrical box to limit how far the first electrical box can be nested into the second electrical box. However, the L-L 300 electrical box stacks of FIG. 4A and the R-R 400 electrical box stacks of FIG. 4C cannot nest because the internal ribs 370, 371 and external grooves 320, 321 are not aligned, thereby preventing the bottom 330 of the electrical box from sliding into the top of an electrical box with the same interfering structure and nesting features. Flat landings 450, 451 may also be included on the bottom 330 of one embodiment of an electrical box that align with internal grooves 370, 371 respectively as an additional feature that prevents the nesting of identical electrical boxes. FIG. 4A clearly illustrates the bottom 330 of one box (version L 300) cannot be slid through the open top 340 of another same box (version L 300). The sides 350 and 351 of the first box (version L 300) cannot be placed at any depth into the inside of the second identical box (version L 300). There is no orientation that defeats the concept.

Other shapes and configurations of electrical boxes are contemplated as well. For example, round electrical boxes (such as ceiling boxes), octagon boxes, square boxes, and any other rectilinear or curvilinear shaped boxes and the like may also be used. Additionally, although implementations have thus far been described with reference to single gang electrical boxes, this document encompasses electrical boxes with any number of gangs (e.g., two, three, four, and the like).

In places where the description above refers to particular implementations of an electrical box, it should be readily apparent that a number of modifications may be made without departing from the spirit thereof. The disclosed implementations are, therefore, to be considered in all respects as illustrative and not restrictive. Accordingly, many additional implementations are possible. The accompanying claims are intended to cover such modifications as would fall within the true spirit and scope of the disclosure set forth in this document. All changes that come within the meaning of and range of equivalency of the claims are intended to be embraced therein.

Additionally, while the configuration and nesting of electrical box implementations have been described, it will be understood that the configuration and nesting of electrical box implementations are not limited to the specific components or steps as disclosed. Any components or steps or sequence of steps indicated herein are given as examples of possible components, steps or sequence of steps and not as limitations, since various configurations, processes and sequences of steps may be used. Other electrical box implementations may be configured and nested in similar manners.

The concepts disclosed herein are not limited to the specific implementations shown herein. For example, implementations of electrical boxes, and implementing components, may be formed of any of many different types of materials or combinations thereof that can readily be formed into shaped objects provided that the materials selected are consistent with the intended operation of electrical box implementations. For example, the components may be formed of: polymers such as thermoplastics (such as ABS, Fluoropolymers, Polyacetal, Polyamide; Polycarbonate, Polyethylene, Polypropylene (low or high density), Polysulfone, and/or the like), thermosets (such as Epoxy, Phenolic Resin, Polyimide, Polyurethane, Silicone, and/or the like), any combination thereof, and/or other like materials; composites and/or other like materials; metals and/or other like materials; alloys and/or other like materials; any other suitable material; and/or any combination of the foregoing thereof. Also, appropriate mounting fasteners, hardware and components may be provided. Those of ordinary skill in the art will readily be able to select appropriate materials and manufacture these products from the disclosures provided herein.

Furthermore, the electrical boxes, ribs, nail bosses, and any other components forming any particular implementation of an electrical box may be manufactured simultaneously or separately and integrally joined with one another, while other components may be pre-manufactured or manufactured separately and then assembled with the integral components. Various implementations may be manufactured using conventional procedures as added to and improved upon through the principles described here. Accordingly, manufacture of these components separately or simultaneously may involve extrusion, vacuum forming, injection molding, blow molding, casting, forging, cold rolling, milling, drilling, reaming, turning, grinding, stamping, pressing, cutting, bending, welding, soldering, hardening, riveting, punching, and/or the like. Components manufactured separately may then be coupled or removably coupled with the other integral components, if necessary, in any manner, such as with adhesive, a weld joint, a solder joint, a fastener (e.g. a bolt, a bolt and a nut, a screw, a rivet, a pin, and/or the like), washers, retainers, any combination thereof, and/or the like for example, depending on, among other considerations, the particular material forming the components. Other possible steps might include sand blasting, polishing, powder coating, zinc plating, anodizing, hard anodizing, and/or painting the components for example.

For example, via injection molding, versions of electrical boxes can be made by the use of a dedicated tool (e.g., a mold) for each version or by making one tool with a specific set of first version cavities, a specific set of second version cavities, a specific set of third version cavities, and the like.

One particular benefit that may be found in particular implementations of electrical boxes disclosed in this document is the value added from being able to store and transport non-identical electrical boxes in a nested condition. By significantly reducing the transport size, the transport and storage cost is also significantly reduced.

The invention claimed is:

1. A system of electrical boxes, comprising:
    at least two similarly sized electrical boxes each comprising four side walls extending from a back wall to an open front;
    a first pattern of at least one interfering structure on a first electrical box of the two electrical boxes;
    a second pattern of at least one interfering structure on a second electrical box of the two electrical boxes, the first and second patterns of at least one interfering structure positioned to allow the back wall of the first electrical box to nest within the open front of the second electrical box, and allow the back wall of the second electrical box to nest within the open front of the first electrical box, the first pattern of the interfering structure preventing an electrical box having the first pattern from being inserted into the open end of a first electrical box.

2. The system of electrical boxes of claim 1, wherein at least two similarly sized electrical boxes comprises at least three electrical boxes and the first pattern of at least one interfering structure on the first electrical box comprises the first pattern of at least one interfering structure on the first and third electrical boxes, the first pattern positioned to prevent the back wall of the first electrical box to fit within the open front of the third electrical box and prevent the back of the third electrical box to fit within the open front of the first electrical box.

3. The system of electrical boxes of claim 2, wherein each of the at least three boxes comprises an internal shoulder and an external shoulder on each of the four side walls, the internal and external shoulders positioned between the open front and the back wall.

4. The system of electrical boxes of claim 3, wherein:
    the first pattern of at least one interfering structure comprises:
        at least one first pattern internal rib on at least one wall of the four side walls, the at least one first pattern internal rib extending perpendicularly from the open front towards the internal shoulder;
        at least one first pattern external groove on at least one wall of the four side walls, the at least one first pattern external groove extending perpendicularly from the back wall towards the external shoulder, the at least one first pattern external groove nonaligned with the at least one first pattern internal rib;
    the second pattern of at least one interfering structure comprises:
        at least one second pattern internal rib on at least one wall of the four side walls and extending perpendicularly from the open front towards the internal shoulder, the at least one second pattern internal rib positioned to fit within the at least one first pattern external groove when the back wall of the second electrical box is placed within the open front of the first or third electrical boxes; and
        at least one second pattern external groove on at least one wall of the four side walls and extending perpendicularly from the back wall towards the external shoulder, the at least one second pattern external groove positioned to house the at least one first pattern internal rib when the back wall of the first or third electrical box is placed within the open front of the second electrical box.

5. The system of electrical boxes of claim 4, wherein the first and second patterns minor one another in positioning of the respective interfering structures.

6. The system of electrical boxes of claim 5, wherein the at least one first pattern internal rib and the at least one first pattern external groove are positioned offset from one another on the same side wall of the at least four side walls of the first and third electrical boxes, and the at least one second pattern internal rib and the at least one second pattern external groove are positioned offset from one another on the same wall of the at least four side walls of the second electrical box.

7. The system of electrical boxes of claim 6, wherein each of the at least three electrical boxes comprises:
    two mounting screw apertures each positioned on interior surfaces of opposing side walls of the four side walls and extending from the open front towards the back wall; and
    two mounting screw grooves aligned with the two mounting screw apertures and extending at least partially between the open front and the back wall.

8. The system of electrical boxes of claim 7, further comprising a nail boss coupled to an exterior surface of each side wall comprising one mounting screw on the interior surface.

9. The system of electrical boxes of claim 8, wherein:
    the at least one first pattern internal rib and the at least one first pattern external groove are positioned on a different side wall of the four side walls than the two mounting screw apertures on the first and third electrical boxes; and
    the at least one second pattern internal rib and the at least one second pattern external groove are positioned on a different side wall of the four side walls than the two mounting screw apertures on the second electrical box.

10. The system of electrical boxes of claim 9, wherein:
    the at least one first pattern internal rib comprises at least two first pattern internal ribs, each of the first and third electrical boxes comprising at least one first pattern internal rib on two opposing walls;

the at least one first pattern external groove comprises at least two first pattern external grooves, each of the first and third electrical boxes comprising at least one first pattern external groove on two opposing walls;

the at least one second pattern internal rib comprises at least two second pattern internal ribs, the second electrical box comprising at least one second pattern internal rib on two opposing walls; and the at least one second pattern external groove comprises at least two second pattern external grooves, the second electrical box comprising at least one second pattern external groove on two opposing walls.

11. The system of electrical boxes of claim 10, wherein:

the at least two first pattern internal ribs comprise four first pattern internal ribs, each of the first and third electrical boxes comprising two first pattern internal ribs on two opposing side walls;

the at least two first pattern external grooves comprise four first pattern external grooves, each of the first and third electrical boxes comprising two first pattern external grooves on two opposing side walls;

the at least two second pattern internal ribs comprise four second pattern internal ribs, the second electrical box comprising two second pattern internal ribs on two opposing side walls; and the at least two first second external grooves comprise four second pattern external grooves, the second electrical boxes comprising two second pattern external grooves on two opposing side walls.

12. The system of electrical boxes of claim 1, wherein said second pattern on said second electrical box prevents an electrical box having the second pattern from being inserted into the open end of a second electrical box.

13. The system of electrical boxes of claim 12, wherein said first pattern is formed on an inner surface of said first electrical box to prevent nesting with a first electrical box, and said second pattern is formed on an inner surface of said second electrical box to prevent nesting with a second electrical box and enabling nesting with a first electrical box.

14. The system of electrical boxes of claim 12, wherein said first pattern comprises at least one internal structure on a side wall of said first electrical box and an external structure on a sidewall of said first electrical box, said external structure interfering with the internal structure of another first electrical box, and said second pattern comprises at least one internal structure on a side wall of said second electrical box and an external structure on a sidewall of said second electrical box, said external structure interfering with the internal structure of another second electrical box.

15. A method of stacking electrical boxes, the method comprising:

providing a first electrical box comprising four side walls extending from a back wall to an open front and a first pattern of at least one interfering structure positioned to prevent another electrical box comprising the first pattern of at least one interfering structure from being inserted into the open front of the first electrical box;

providing a second electrical box comprising four side walls extending from a back wall to an open front and a second pattern of at least one interfering structure positioned to prevent another electrical box comprising the second pattern of at least one interfering structure from being inserted into the open front of the second electrical box;

aligning the interfering structures of the first and second electrical boxes; and inserting the back wall of the second electrical box into the open front of the first electrical box.

16. The method of stacking electrical boxes of claim 15, further comprising:

providing third electrical box comprising four side walls extending from a back wall to an open front and the first pattern of at least one interfering structure; and aligning the interfering structures of the second and third electrical boxes; and inserting the back wall of the third electrical box into the open front of the second electrical box.

17. The method of stacking electrical boxes of claim 16, wherein:

aligning the interfering structures of the first and second electrical boxes comprises aligning at least one second pattern external groove on the second electrical box with at least one first pattern internal rib on the first electrical box; and aligning the interfering structures of the second and third electrical boxes comprises aligning at least one first pattern external groove on the third electrical box with at least one second pattern external groove on the second electrical box.

18. The method of stacking electrical boxes of claim 15, further comprising:

providing a first plurality of electrical boxes each comprising four side walls extending from a back wall to an open front and the first pattern of at least one interfering structure;

providing a second plurality of electrical boxes each comprising four side walls extending from a back wall to an open front and the second pattern of at least one interfering structure;

aligning the interfering structures of the first plurality of electrical boxes and the interfering structures of the second plurality of electrical boxes;

inserting the back walls of the first plurality of electrical boxes into the open fronts of the second plurality of electrical boxes; and inserting the back walls of the second plurality of electrical boxes into the open fronts of the first plurality of electrical boxes.

19. The method of stacking electrical boxes of claim 18, wherein aligning the interfering structures of the first plurality of electrical boxes and the interfering structures of the second plurality of electrical boxes comprises:

aligning at least one second pattern external groove on each of the second plurality of electrical boxes with at least one first pattern internal rib on each of the first plurality of electrical boxes; and aligning at least one first pattern external groove on each of the first plurality of electrical boxes with at least one second pattern internal rib on each of the second plurality of electrical boxes.

20. A system of electrical boxes, comprising:

a first electrical box comprising:

four side walls extending from a back wall to an open front, the four side walls comprising a first side wall, a second side wall adjacent to the first side wall, a third side wall adjacent to the second side wall and opposite the first side wall, and a fourth side wall adjacent the third side wall and opposite the second side wall;

a mounting screw aperture protruding from an interior surface on each of the first and third side walls;

an external shoulder on each of the first, second, third, and fourth sidewalls;

an internal should on each of the first, second, third, and fourth sidewalls;

at least one first pattern internal rib on at least one of the second or fourth sidewalls and extending from the open front to the internal shoulder, the at least one internal rib positioned a first distance from the first side wall;

at least one first pattern external groove on at least one of the second or fourth sidewalls and extending from the back wall to the external shoulder, the at least one first pattern external groove positioned a second distance from the first side wall different from the first distance; and a second electrical box comprising:

four side walls extending from a back wall to an open front, the four side walls comprising a first side wall, a second side wall adjacent to the first side wall, a third side wall adjacent to the second side wall and opposite the first side wall, and a fourth side wall adjacent the third side wall and opposite the second side wall;

a mounting screw aperture protruding from an interior surface on each of the first and third side walls;

an external shoulder on each of the first, second, third, and fourth sidewalls;

an internal should on each of the first, second, third, and fourth sidewalls;

at least one second pattern internal rib on at least one of the second or fourth sidewalls and extending from the open front to the internal shoulder, the at least one internal rib positioned the second distance from the first side wall;

at least one second pattern external groove on at least one of the second or fourth sidewalls and extending from the back wall to the external shoulder, the at least one second pattern external groove positioned the first distance from the first side wall such that the at least one second pattern external groove aligns with the first pattern internal rib of the first electrical box when the back wall of the second electrical box is inserted into the open front of the first electrical box.

21. The system of electrical boxes of claim 20, further comprising a third electrical box, the third electrical box comprising:

four side walls extending from a back wall to an open front, the four side walls comprising a first side wall, a second side wall adjacent to the first side wall, a third side wall adjacent to the second side wall and opposite the first side wall, and a fourth side wall adjacent the third side wall and opposite the second side wall;

a mounting screw aperture protruding from an interior surface on each of the first and third side walls;

an external shoulder on each of the first, second, third, and fourth sidewalls;

an internal should on each of the first, second, third, and fourth sidewalls;

at least one first pattern internal rib on at least one of the second or fourth sidewalls and extending from the open front to the internal shoulder, the at least one internal rib positioned the first distance from the first side wall;

at least one first pattern external groove on at least one of the second or fourth sidewalls and extending from the back wall to the external shoulder, the at least one first pattern external groove positioned the second distance from the first side wall such that the at least one first pattern external groove aligns with the second pattern internal rib of the second electrical box when the back wall of the third electrical box is inserted into the open front of the second electrical box.

22. The system of electrical boxes of claim 21, further comprising a fourth electrical box, the fourth electrical box comprising:

four side walls extending from a back wall to an open front, the four side walls comprising a first side wall, a second side wall adjacent to the first side wall, a third side wall adjacent to the second side wall and opposite the first side wall, and a fourth side wall adjacent the third side wall and opposite the second side wall;

a mounting screw aperture protruding from an interior surface on each of the first and third side walls;

an external shoulder on each of the first, second, third, and fourth sidewalls;

an internal should on each of the first, second, third, and fourth sidewalls;

at least one second pattern internal rib on at least one of the second or fourth sidewalls and extending from the open front to the internal shoulder, the at least one internal rib positioned the second distance from the first side wall;

at least one second pattern external groove on at least one of the second or fourth sidewalls and extending from the back wall to the external shoulder, the at least one second pattern external groove positioned the first distance from the first side wall such that the at least one second pattern external groove aligns with the first pattern internal rib of the first or the third electrical box when the back wall of the second electrical box is inserted into the open front of the first or the third electrical box.

23. The system of electrical boxes of claim 22, further comprising a nail boss coupled to at least one of the first or third sidewalls of each of the first, second, third, and fourth electrical boxes.

* * * * *